United States Patent [19]

Yoneda

[11] Patent Number: 4,717,001
[45] Date of Patent: Jan. 5, 1988

[54] FRICTION CLUTCH
[75] Inventor: Kazuhiko Yoneda, Katano, Japan
[73] Assignee: Kabushiki Kaisha Daikin Seisakusho, Osaka, Japan
[21] Appl. No.: 760,424
[22] Filed: Jul. 30, 1985
[30] Foreign Application Priority Data
 Jul. 31, 1984 [JP] Japan ............... 59-118898[U]
[51] Int. Cl.⁴ ............................. F16D 13/71
[52] U.S. Cl. ................. 192/30 V; 192/70.11; 192/70.19; 192/70.27
[58] Field of Search ........... 192/30 V, 70.17, 70.19, 192/70.25, 70.27, 109 R, 111 A, 70.11

[56] References Cited
U.S. PATENT DOCUMENTS

| 3,086,634 | 4/1963 | Reed | 192/111 A |
| 4,326,611 | 4/1982 | Billet | 192/70.27 X |
| 4,339,023 | 7/1983 | Maycock | 192/111 A X |
| 4,466,524 | 8/1984 | Lane | 192/111 A X |
| 4,601,373 | 7/1986 | Despres et al. | 192/109 R X |

FOREIGN PATENT DOCUMENTS

| 56-111329 | 8/1981 | Japan . | |
| 421254 | 9/1933 | United Kingdom | 192/52 |

Primary Examiner—Rodney H. Bonck
Attorney, Agent, or Firm—Armstrong, Nikaido, Marmelstein & Kubovcik

[57] ABSTRACT

A friction clutch comprises holes bored in a pressure plate. The holes are bored parallel to the center line of the clutch. A roll pin extends parallel to the center line and is slidably press fitted into each of the holes. The roll pin is supported in a pressure contact at both ends between the flywheel and the clutch cover. The roll pin may have a disk-shaped highly rigid friction material at one end.

12 Claims, 6 Drawing Figures

FRICTION CLUTCH

BACKGROUND OF THE INVENTION

1. Industrial Useful Field

This invention relates to a friction clutch suitable particularly for use as an auto clutch.

2. Prior Art

Conventionally, a friction clutch has a clutch disk and a pressure plate for pressing the clutch disk toward an engine-side flywheel. Both the clutch disk and the pressure plate are concentrically arranged in a space defined by and between the flywheel and a clutch cover fixed to the flywheel. Such a friction clutch has a drawback because the pressure plate vibrates relative to the clutch cover, which may lead to the development of abnormal noises from the clutch and/or abnormal vibrations from a lever coupled to a clutch pedal for driving the pressure plate.

As an approach to overcome such a drawback, an arrangement is known which is intended to absorb the vibrational energy of the pressure plate in order to prevent the development of abnormal noises and/or vibrations therefrom (for example, one disclosed in Japanese Utility Model Application No. 55-9937, Publication No. 56-111329). That is, between the inner periphery of the clutch cover and the outer periphery of the pressure plate there is interposed a friction material which is to be pressed against either the clutch cover or the pressure plate by means of a resilient member. However, such an arrangement has disadvantages in that it involves a larger number of parts and because the clutch is subject to considerable variations in centrifugal force from the rotation of the clutch cover, which prevents stable operation of the clutch. Moreover, such an arrangement is not easy to set up.

3. Problem of the Prior Art and Object of the Invention

With the aforesaid prior-art arrangement, one difficulty is that it involves a larger number of parts, which means a higher cost; and another difficulty is that it permits no stable clutch operation. A further difficulty is that the arrangement is not easy to set up and accordingly it involves an increased cost of assembling.

It is the object of this invention to overcome these difficulties.

4. Structure of the Invention

In order to accomplish the aforesaid object, this invention provides a friction clutch having a clutch disk and a pressure plate for pressing the clutch disk toward an engine-side flywheel. Both the clutch disk and the pressure plate are concentrically arranged in a space defined by and between the flywheel and a clutch cover fixed to the flywheel. The friction clutch comprises holes bored in the pressure plate, each hole extending in a parallel relation to the center line of the clutch. A roll pin extends in a parallel relation to the center line and is slidably press fitted into each of said holes. The roll pin is held at both ends between the flywheel and the clutch cover.

DETAILED DESCRIPTION OF THE INVENTION

Embodiment 1

Figure 1:
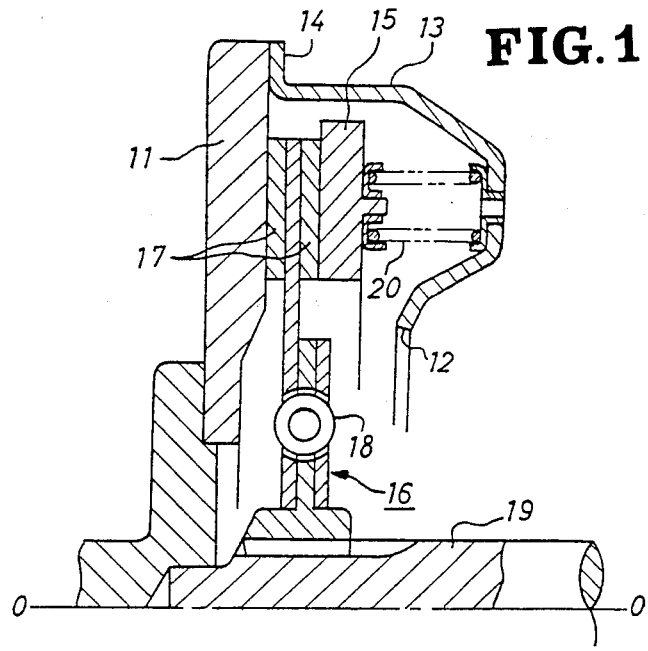
FIG. 1 is a longitudinal sectional partly schematic view showing one portion of a friction clutch embodying this invention.

Referring first to FIG. 1, which is a longitudinal sectional partly schematic view showing one embodiment of the invention, numeral 11 designates an engine-side flywheel, which is a disk-form member centered on a center line 0—0. Concentrically with the flywheel 11 there is disposed a dished clutch cover 13 having a hole 12 in the center portion thereof. A flange 14 formed at the outer peripheral extremity of the clutch cover 13 is fixed to the flywheel 11 by bolts not shown. In a space defined by and between the flywheel 11 and the clutch cover 13 there are concentrically disposed an annular pressure plate 15 and a clutch disk 16. Between the pressure plate 15 and the flywheel 11 there are disposed facings 17 provided on the outer peripheral portion of the clutch disk 16. The clutch disk 16 has a damper portion 18 for absorbing peripheral torque variations in the circumferential direction and has its inner peripheral portion held in spline engagement with an output shaft 19. The output shaft 19 is connected, for example, to a transmission not shown.

Figure 2:
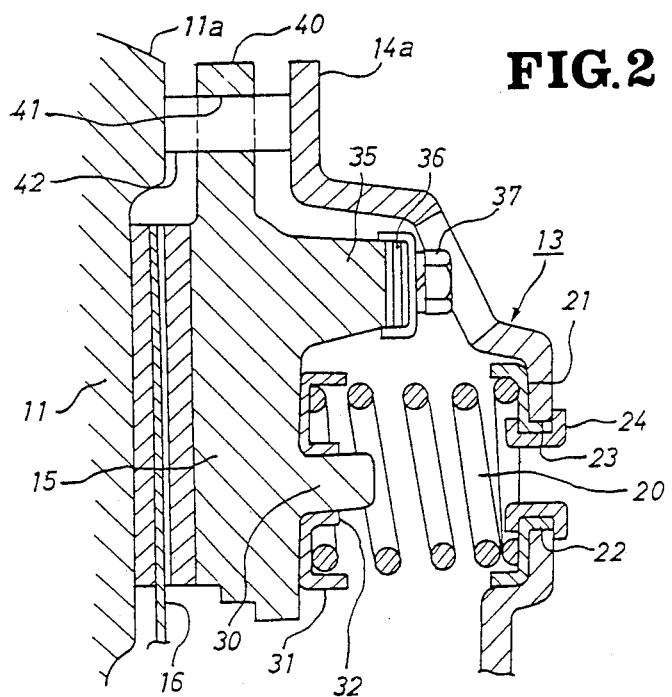
FIG. 2 is a longitudinal sectional partly enlarged view showing another portion of the friction clutch.

FIG. 2 is a longitudinal sectional partly enlarged view showing another aspect of the embodiment. As can be seen from FIG. 2, between the clutch cover 13 and the pressure plate 15 a set of coil springs 20 is disposed which extends in the transverse direction in the drawing (i.e., in the direction of center line 0—0 in FIG. 1). Sets of coil springs 20 are arranged in an equispaced apart relation in the circumferential direction of the clutch cover 13 so that they constantly urge the pressure plate 15 toward the flywheel 11. Between the coil springs 20 and the clutch cover 13 there is interposed a generally cup shaped spring cap 21 which is open toward the pressure plate 15. A cylindrical portion 22 provided medially in the spring cap 21 fits in a positioning hole 23 provided in the clutch cover 13. A cylindrical cap support 24 fits on the inner periphery of the cylindrical portion 22. Both extremities of the cap support 24 are caulked on the outer peripheral side, whereby the spring cap 21 is fixed to the clutch cover 13. On one portion of the pressure plate 15, which corresponds to a median portion of the array of coil springs 20, there is integrally formed a positioning projection 30 which extends toward the clutch cover 13. Between the pressure plate 15 and the coil springs 20 there is interposed a generally cup shaped spring seat 31 which is open toward the clutch cover 13. The spring seat 31 has a cylindrical portion 32 provided in the center thereof and fits in the projection 30 so that the spring seat 31 is positioned in place relative to the pressure plate 15.

On the pressure plate 15 and outwardly of the coil springs 20 there are provided a plurality of bosses 35 in a circumferentially equispaced apart relation. A plurality of strap plates 36 extending in a generally circumferential direction are integrally fixed at one end thereof to each of the bosses 35 by a bolt 37. Each strap plate 36 is a generally rectangular member comprised of a leaf spring. The bolt 37 is fixed at the other end thereof to the clutch cover 13 by a rivet not shown. By virtue of the strap plates 36 the pressure plate 15 is urged in a direction opposite from the direction of effect of the coil springs 20 (i.e., in the rightward direction in the drawing), by a substantially smaller spring force than the coil springs 20.

Figure 3:
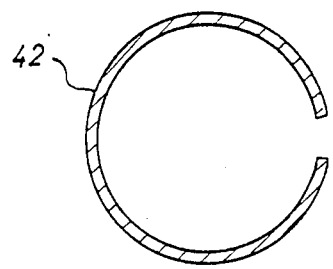
FIG. 3 is a longitudinal section of a roll pin.

At outer peripheral extremities of the pressure plate 15 there are integrally formed a plurality of tongues 40 (e.g., 4 in number) each extending radially outwardly of the pressure plate 15. The tongues 40 are circumferentially equispaced from one another. The clutch cover 13 has a flange portion 14a extending radially outwardly and spaced apart from the flywheel 11, the tongues 40 are interposed in the gap defined therebetween and in a circumferentially spaced apart relation. Each tongue 40 has a hole 41 bored therethrough and extending in parallel to the center line, with a roll pin 42 slidably press fitted into the hole 41. The roll pin 42 is a steel-made member having a C-shaped section as shown in FIG. 3 and is radially expansible. In FIG. 2, the roll pin 42 extends in the direction of the center line and is held in pressure contact at its both ends with and between the flange portion 14a and protrusion 11a formed on the flywheel 11.

The pressure plate 15 is cooperative with a clutch pedal through a drive lever, though such arrangement is not shown. When the clutch pedal is stepped on, the drive lever is actuated so that the pressure plate 15 is forcibly moved in the rightward direction in the drawing and against the force of the coil springs 20.

Function of the Invention

Operation of the friction clutch of the invention will now be explained. FIG. 1 illustrates the clutch in an ON (engaged) condition. A torque transmitted from the engine to the flywheel 11 is transferred to the output shaft 19 through the clutch disk 16 held in position between the flywheel 11 and the pressure plate 15. Any variations in torque are absorbed by the damper portion 18.

When a clutch pedal (not shown) is stepped on to move the pressure plate 15 rightward in the drawing, the facings 17 are released from being held by the flywheel 11 and pressure plate 15, so that the clutch is brought to an OFF (disengaged) condition, with no torque from the engine being transmitted to the output shaft 19. In this state of the clutch, the pressure plate 15 is elastically supported in the direction of center line 0—0 relative to the clutch cover 13, being thus easily subject to vibration. In this case, however, as may be seen from FIG. 2, friction occurs between the hole 41 in the tongue 40 of the pressure plate 15 and the roll pin 42, so that the vibration energy of the pressure plate 15 is absorbed. Thus, the vibration of the plate 15 is damped. Consequently, development of abnormal noises from the vibration of the pressure plate 15, as well as abnormal vibration of the drive lever (not shown) for driving the pressure plate 15, is prevented. In the present embodiment, as already described, the roll pin 42 fits into the hole 41 in parallel relation to the center line 0—0; therefore, the frictional surfaces will not part from each other when they are subjected to strong centrifugal force. Hence, positive friction between the hole 41 and the roll pin 42 is assured irrespective of the rotational speed, so that the vibration of the pressure plate 15 can be effectively prevented.

In clutch assembling operation, the setting up of the anti-vibration mechanism for preventing the vibration of the pressure plate 15 is completed simply by inserting the roll pin 42 into the hole 41 in the pressure plate 15. Furthermore, the fact that a roll pin 42 is press fitted into each hole 41 eliminates the problem that individual roll pins may be scattered or lost prior to assembly work.

Effect of the Invention

As above described, the present invention provides a friction clutch having a clutch disk and a pressure plate for pressing the clutch disk toward an engine-side flywheel. Both the clutch disk and the pressure plate are concentrically arranged in a space defined by and between the flywheel and a clutch cover fixed to the flywheel. The friction clutch comprises holes bored in the pressure plate, each hole extending in a parallel relation to the center line of the clutch. A roll pin extends in parallel relation to the center line and is slidably press fitted into each of the holes. The roll pin is held at both ends between the flywheel and the clutch cover. Therefore, (a) the invention involves a smaller number of parts than the conventional arrangement, which means reduced cost;

(b) the invention permits effective absorption of vibration energy through friction regardless of rotational speed, thus making it possible to positively prevent the development of abnormal noises from the vibration of the pressure plate 15 and abnormal vibrations of the drive lever; and (c) the invention provides considerable ease of assembly work, so that the cost of assembly work can be reasonably reduced.

Figure 4:
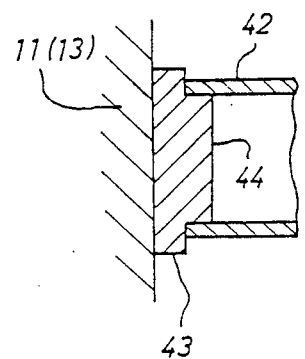
FIG. 4 is a partial view in longitudinal section showing another embodiment.

Other Embodiments (a) As FIG. 4 shows, a disk-shaped friction material 43 may be interposed between the roll pin 42 and either the flywheel 11 or the clutch cover 13 or both of them. The friction material 43 is a comparatively rigid member composed of asbestos, for example and has a protrusion 44 integrally formed therewith in its center portion. The protrusion is press fitted into the roll pin 42.

Where such friction material is used, it is easy to have the roll pin 42 firmly held between the flywheel 11 and the clutch cover 13. Any radial vibration, though slight, caused to the pressure plate 15 can be absorbed by the friction material 43.

(b) The roll pin 42 is not limited to one having a C-shaped section, but it may be of a spiral shape.

Figure 6:
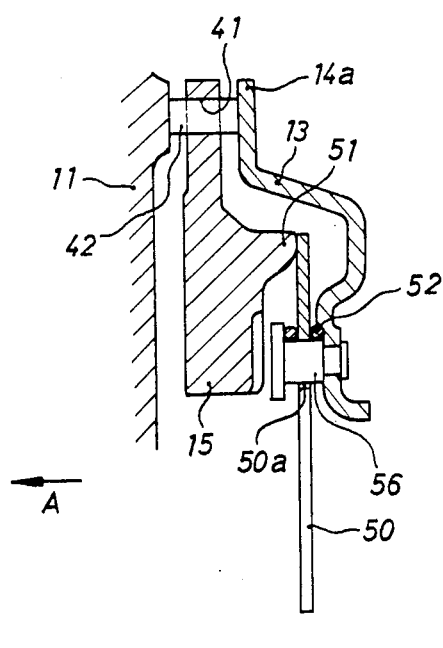
FIG. 6 is a partial longitudinal sectional view showing a still further embodiment.
Figure 5:
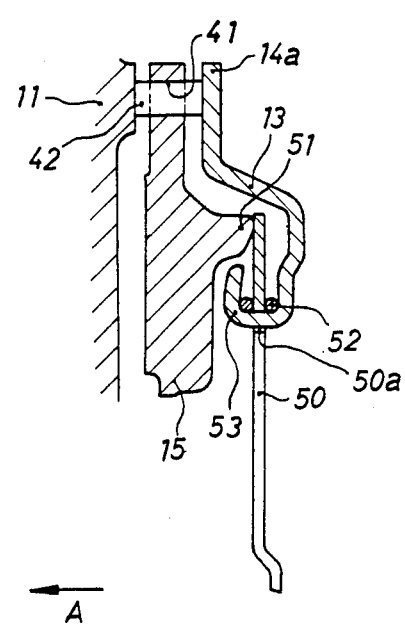
FIG. 5 is a partial longitudinal sectional view showing a further embodiment.

(c) The invention can also be applied to a clutch disk of the type having a diaphragm spring 50, as shown in FIGS. 5 and 6 instead of coil spring 20.

The clutch disk shown in FIG. 5 has L-shaped tags 53 formed at a plurality of locations in the inner peripheral end portion of the clutch cover 13. Each tag 53 is inserted into an oval-shaped hole 50a of a diaphragm spring 50. A pair of wire rings 52 is fitted along the peripheral wall of the tag 53. The diaphragm spring 50 is held between the pair of wire rings 52. The diaphragm spring 50, at its outer peripheral end, abuts an annular protrusion 51 of the pressure plate 15 and, at its inner peripheral end, abuts a release bearing not shown. Other constructional features are similar to those in FIG. 1: in the outer peripheral end portion of the pressure plate 15 there are provided holes 41 parallel to the center line of the clutch, a roll pin 42 extending in parallel relation to said center line and slidably press fitted into each of the holes 41, the roll pin 42 being held at its both ends between the flywheel 11 and the pressure plate 15.

In short, the clutch shown in FIG. 5 is a clutch disk of the type in which the wire rings 52 and the diaphragm spring 50 are held directly by the clutch cover 13, and which is generally called a DST (diaphragm spring turnover) clutch.

In the case of the FIG. 5 clutch, the inner peripheral end of the diaphragm spring 50 is pushed by means of the release bearing in the direction of arrow A, whereby the diaphragm spring 50 pivots at its portion which is in abutment with the wire rings 52, so that the outer peripheral end of the diaphragm spring 50 is moved in the opposite direction until the clutch is disengaged.

Another embodiment shown in FIG. 6 is a clutch disk of the type in which wire rings 52 and a diaphragm spring 50 are supported by means of a studpin 56. The construction of pin 42 and hole 41 and other constructional features are similar to those shown in FIG. 5.

Studpins 56 are disposed in plurality in circumferentially spaced apart relation and are fixed to the inner peripheral end end of the clutch cover 13. Each studpin 56 extends in the direction of arrow A and has a collar portion at one end (on the arrow A directional side).

What is claimed is:

1. A friction clutch having a clutch disk and a pressure plate for pressing said clutch disk toward an engine-side flywheel, both said clutch disk and said pressure plate being concentrically arranged in a space defined by and between said flywheel and a clutch cover fixed to said flywheel, said friction clutch comprising:
    holes bored in outwardly projecting tongues integrally formed on said pressure plate, each hole extending in a parallel relation to a center line of said clutch,
    a roll pin extending in a parallel relation to said center line and slidably press fitted in each of said holes, said roll pin being axially held between said flywheel and said clutch cover in a pressure contact at opposite ends with said flywheel and said clutch cover wherein vibration of said pressure plates is absorbed by friction between said holes and said roll pin.

2. The friction clutch as set forth in claim 1 wherein said roll pin is a steel-made member having a C-shaped section.

3. The friction clutch as set forth in claim 2 wherein a disk-shaped highly rigid friction material is present at one end of said roll pin and wherein said friction material has a protrusion thereon, said protrusion being fixedly press fitted into said roll pin.

4. The friction clutch as set forth in any one of claims 1 to 3 wherein coil springs are provided between said pressure plate and said clutch cover so that said pressure plate is urged toward said flywheel by said resilient force of said coil springs.

5. The friction clutch as set forth in any one of claims 1 to 3, wherein said clutch disk includes
    L-shaped tags formed in the inner peripheral end portion of the clutch cover,
    a diaphragm spring and a pair of wire rings fitted on each of said tags,
    said diaphragm spring being supported between said wire rings,
    said pressure plate being urged toward said flywheel by said diaphragm spring.

6. The friction clutch as set forth in any one of claims 1 to 3 wherein said clutch disk includes
    studpins disposed at a plurality of locations in the inner peripheral end portion of said clutch cover,
    a diaphragm spring and a pair of wire rings fitted on each of said studpins,
    said diaphragm spring being supported between said wire rings,
    said pressure plate being urged toward said flywheel by said diaphragm spring.

7. A friction clutch comprising:
    an engine-side flywheel;
    a clutch cover fixed to said flywheel;
    a clutch disk;
    a pressure plate for pressing said clutch disk toward said engine-side flywheel, both said clutch disk and said pressure plate being concentrically arranged in a space defined by and between said flywheel and said clutch cover;
    holes bored in said pressure plate, each hole extending in a parallel relation to a center line of said clutch; and
    a roll pin extending in a parallel relation to said center line and slidably press fitted in each of said holes, said roll pin being axially held at both ends between said flywheel and said clutch cover, said roll pin being a steel-made member having a C-shaped section, wherein a disk-shaped highly rigid friction material is present at one end of said roll pin and wherein said friction material has a protrusion thereon, said protrusion being fixedly press fitted into said roll pin.

8. A friction clutch as set forth in claim 7, wherein coil springs are provided between said pressure plate and said clutch cover so that said pressure plate is urged toward said flywheel by the resilient force of said coil springs.

9. A friction clutch as set forth in claim 7, wherein said clutch disk includes
    L-shaped tags formed in the inner peripheral end portion of the clutch cover,
    a diaphragm spring and a pair of wire rings fitted on each of said tags,
    said diaphragm spring being supported between said wire rings,
    said pressure plate being urged toward said flywheel by said diaphragm spring.

10. The friction clutch as set forth in claim 7 wherein said clutch disk includes
    studpins disposed at a plurality of locations in the inner peripheral end portion of said clutch cover,
    a diaphragm spring and a pair of wire rings fitted on each of said studpins,
    said diaphragm spring being supported between said wire rings,
    said pressure plate being urged toward said flywheel by said diaphragm spring.

11. A friction clutch as set forth in any one of claims 1 or 7 further including facings provided on an outer periphery portion of said clutch disk between said pressure plate and said flywheel wherein said facings are releasably held in contact with said flywheel by said pressure plate.

12. A friction clutch having a clutch disk and a pressure plate for pressing said clutch disk toward an engine-side flywheel, both said clutch disk and said pressure plate being concentrically arranged in a space defined by and between said flywheel and a clutch cover fixed to said flywheel, said friction clutch comprising:

holes bored in outwardly projecting tongues integrally formed on said pressure plate, each hole extending in a parallel relation to a center line of said clutch; and a roll pin in each of said holes slidably press fitted in said each of said holes extending in a parallel relation to said center line, said roll pin being axially held between said flywheel and said clutch cover in pressure contact therewith wherein vibration of said pressure plates is absorbed by friction between said holes and said roll pin.

* * * * *